United States Patent Office 3,061,431

Patented Oct. 30, 1962

1

2

3,061,431

PROCESS OF PHOTOPOLYMERIZATION OF COMPOUNDS CONTAINING VINYL GROUPS BY MEANS OF URANIUM SALTS OF ORGANIC ACIDS AS CATALYSTS

Steven Levinos, Vestal, N.Y., assignor to General Aniline & Film Corporation, New York, N.Y., a corporation of Delaware No Drawing. Filed June 25, 1959, Ser. No. 822,764
9 Claims. (Cl. 96—35)

The present invention relates to the imagewise photopolymerization of light sensitive coatings containing a monomeric compound containing the $CH_2{=}C{<}$ grouping while employing a uranium salt of an organic acid as a catalyst or promoter of the reaction and, more particularly, to the imagewise photopolymerization of such coatings by means of visible light.

The initiation of photopolymerization of vinyl monomers by the free radical mechanism is known. Examples of catalysts inducing the formation of free radicals in photopolymerization are organic peroxides such as light sensitive di-tertiary butyl peroxide. Such compounds cause vinyl monomers in the liquid or solid state to undergo polymerization when the monomers are irradiated with light of the near ultraviolet region (about 4000 A.).

It has also been proposed to bring about photopolymerization of vinyl monomers by the free radical mechanism while utilizing as the catalyst a uranium salt of an inorganic acid such as uranyl nitrate or uranyl sulfate. The previously described uranyl catalyzing agents are not entirely dependent on light but also cause polymerization in the dark. Solutions and coatings prepared from vinyl monomers and the previously described uranium catalysts keep only for periods of a few hours after which time they become fully polymerized. This polymerization in the dark is not a major drawback or handicap for many uses and applications in which polymerization is the primary object. However, this instability automatically excludes these systems of inorganic uranium salts and vinyl monomers from use in light sensitive coatings in which a reasonable shelf life is a prime requisite.

Despite these shortcomings which are apparent when the uranyl salts of inorganic acids are used as catalyzing agents for light sensitive coating, I have ascertained that the uranyl salts of aliphatic monobasic and dibasic acids are very effective catalysts for the photopolymerization of monomers containing the $CH_2{=}C{<}$ grouping in light sensitive coatings without causing any spontaneous polymerization in the dark. Specifically, I have determined that such catalysts are extremely useful for effecting the imagewise photopolymerization of vinyl monomer coatings by means of visible light.

Light sensitive coatings of monomers containing the $CH_2{=}C{<}$ grouping and containing a uranyl salt of a monobasic or dibasic acid of the aliphatic and aromatic series as a catalyst and the photopolymerization of monomers containing the $CH_2{=}C{<}$ grouping by resort to the use of such catalysts constitute the purposes and objects of the present invention.

The monomers containing the $CH_2{=}C{<}$ grouping which may be subjected to photopolymerization by my method may be water soluble or soluble in organic solvents such as benzene, toluene, butyl acetate, methanol, ethanol, or the like. Examples of monomers containing the $CH_2{=}C{<}$ grouping which may be photopolymerized by the use of the uranyl salts are acrylamide, acrylonitrile, N-methylol acrylamide, methacrylic acid, acrylic acid, calcium acrylate, methacrylamide, itaconic acid, itaconic acid esters, vinyl acetate, methyl methacrylate, methylacrylate, ethyl acrylate, vinyl benzoate, vinyl pyrrolidone, vinyl methyl ether, vinyl butyl ether, vinyl isopropyl ether, vinyl isobutyl ether, vinyl butyrate, butadiene or mixtures of ethylacrylate with vinyl acetate, acrylonitrile with styrene, butadiene with acrylonitrile, and the like.

Some of the uranyl salts of the organic acids are water soluble; if the monomer is also water soluble, both the monomer and catalyst are dissolved in water prior to coating. Other uranyl salts are soluble in alcohol and can be added from alcoholic solutions. If the monomer is water insoluble, it may be dissolved in an organic solvent such as those mentioned and the uranyl salt dispersed in the oily solution. Preferably a wetting agent such as those mentioned in the application of Steven Levinos, Serial No. 715,528, filed February 17, 1958, may be used to facilitate formation of the dispersion.

The molecular weight and hence the hardness of the polymer obtained through photopolymerization may be increased by utilizing in the reaction mixture a small amount of an unsaturated compound containing at least two terminal vinyl groups each linked to a carbon atom in a straight chain or in a ring. These compounds serve to cross-link the polyvinyl chains and are generally designated as cross-linking agents. Such compounds are described, for example, by Kropa and Bradley in vol. 31, No. 12, of "Industrial and Engineering Chemistry," 1939. Suitable cross-linking agents for my purposes include N,N'-ethylene-bis-acrylamide, triallyl cyanurate, divinyl benzene, divinyl ketones, diglycol-diacrylate and those mentioned in U.S. Patent 2,850,445. The quantity of cross-linking agent may range from about 10 to 50 parts of monomer to each part of cross-linking agent.

Water is a necessary component of the reaction mixture and water must be present for the photopolymerization even if the monomer is insoluble in water. In the case of vinyl monomer coatings, a water soluble colloidal carrier such as gelatin, glue, casein, PVA, methyl Cellosolve and the like is to be used; sufficient water is then retained by the coating to permit the induction of photopolymerization.

Catalysts which are contemplated for use are, as stated, the uranyl salts of mono and dicarboxylic acids, having less than nine carbon atoms. Examples of such compounds are the uranyl salts of formic acid, acetic acid, propionic acid, butyric acid, oxalic acid, succinic acid, glutaric acid, benzoic acid, phenylacetic acid and the three phthalic acids.

The quantity of catalyst employed is a small fraction of the monomer which is subjected to polymerization. Typically, I use about 0.2 to 10 parts of the catalyst to each 100 parts of the monomer, with 1 to 5 parts of catalyst constituting the preferred ratio.

The photopolymerization may be effected by irradiation of the reaction mixture with radiation ranging from $10^{-4}$ to $10^{-10}$ cm. However, since photopolymerization particularly of the monomer coatings can be effected by visible light, I prefer the utilization of such radiations.

My invention is particularly suitable for the manufacture of light sensitive coatings while utilizing a colloidal carrier such as specified above containing the monomer, cross-linking agent and the catalyst. Such coatings may be made on paper, metal such as aluminum sheets which may be anodized or treated with sodium phosphate, sodium silicate and the like, or on resins such as saponified cellulose acetate or copolymers of maleic anhydride with a vinyl alkyl ether such as vinyl methyl ether, vinyl ethyl ether, vinyl butyl ether or the like. Printing plates may be made with the use of such sensitized coatings by exposing the coatings under a pattern to cause photopolymerization of the coatings in the exposed areas and developing of the image by washing away the unpolymerized areas. Similarly, such coatings may be used in a transfer process by contacting a coating which has been exposed imagewise with a paper sheet to selectively remove from the exposed coating the unpolymerized portions. The unpolymerized portions transferred to the receiving sheet may be further hardened by exposure. The procedure described in application Serial No. 783,715 filed December 30, 1958, may be specifically utilized with coatings of the present invention.

The invention will be further illustrated by the following examples, but it is to be understood that the invention is not restricted thereto.

*Example I*

On a clean anodized aluminum sheet the following coating is applied:

| | | |
|---|---|---|
| Acrylamide | grams | 180 |
| Water | milliliters | 120 |
| N,N'-methylene-bis-acrylamide | grams | 10 |
| Gelatin (10%) | milliliters | 40 |
| Uranyl propionate (5% solution) | do | 10 |
| Saponin (8%) | do | 3 |

After drying the coating is exposed through a transparent photograph negative to white light. (Photoflood bulb 350 watt, distance 30 inches, exposure time 60 seconds.)

The unpolymerized parts of the coating are washed out wit warm water (40–45° C.) and a continuous tone resist remains which may be dyed with water soluble dyes.

*Example II*

On a smooth paper base a 5 percent aqueous solution of PVM/MA (a copolymer of polyvinyl methyl ether and maleic anhydride) is applied as a subcoat. After drying the following is coated on the water repellent paper base:

| | | |
|---|---|---|
| Acrylamide | grams | 120 |
| Water | milliliters | 160 |
| N,N'-methylene-bis-acrylamide | grams | 15 |
| Gelatin (15%) | milliliters | 35 |
| Uranyl oxalate (20% alcoholic solution) | do | 18 |
| Saponin (8%) | do | 5 |

After drying the paper is exposed through a transparent photographic line negative to white light (see Example I). Exposure time: 40 seconds. After elimination of the unpolymerized parts of the coating by washing with warm water (40–45° C.) a very sharp positive resist is obtained which may be made visible by applying a 0.5 percent aqueous solution of nigrosine on the surface of the paper.

*Example III*

Example I was repeated with the exception that uranyl acetate was used in place of uranyl propionate. By coating, exposing and washing this composition, as in Example I, imagewise photopolymerization took place in a period of about 20 seconds.

*Example IV*

The procedure was the same as in Example II, excepting that uranyl succinate was used in place of uranyl oxalate. The image was made visible by adding to the wash water a small amount of potassium ferrocyanide, or one of the other alkali ferrocyanides, and omitting the treatment with the nigrosine solution.

*Example V*

The procedure was the same as in Example I, excepting that the acrylamide was replaced by an equivalent quantity of acrylic acid. The results were similar to those obtained in Example I.

*Example VI*

Example I was repeated with the exception that uranyl phenylacetate was used in place of uranyl propionate. By coating, exposing and washing this composition, as in Example I, imagewise photopolymerization took place in a period of about 60 seconds.

*Example VII*

The procedure was the same as in Example II, excepting that uranyl phthalate was used in place of uranyl oxalate. The image was made visible by adding to the wash water a small amount of an alkali metal sulfide such as sodium or potassium sulfide and omitting the treatment with the nigrosine solution.

All of the coatings prepared from the above listed monomers and the above listed organic uranyl salts have good shelf life and remain stable without loss of sensitivity for periods exceeding fourteen months. However, it is to be noted that coatings utilizing uranyl salts of acids having more than one carbon atom have an even greater dark storage stability than coatings using uranyl formate as a catalyzing agent.

Modifications of the invention will occur to persons skilled in the art. Thus, in lieu of using the monomers of the examples, any of the monomers specified above may be employed. The same is true with regard to the uranyl salts of the aliphatic acids.

I, therefore, do not intend to be limited in the patent granted except as necessitated by the prior art and the appended claims.

I claim:

1. A light sensitive photographic material comprising a base coated with a gelatin layer containing an ethylenically unsaturated compound, a cross-linking agent containing at least two vinyl groups and containing as the sole polymerization catalyst a catalytic amount of a uranyl salt of an organic acid having no more than eight carbon atoms, said carrier containing a sufficient amount of water to permit upon exposure to light, the induction of photopolymerization.

2. A light sensitive photographic material comprising a base coated with a colloidal hydrophilic carrier containing a monomer containing the $CH_2=C<$ grouping, a cross-linking agent containing at least two vinyl groups containing as the sole polymerization catalyst a catalytic amount of a uranyl salt of an organic acid having no more than eight carbon atoms, said carrier containing a sufficient amount of water to permit upon exposure to light, the induction of photopolymerization.

3. A light sensitive material according to claim 2 wherein said uranyl salt is uranyl propionate.

4. The process as defined in claim 2 wherein the uranyl salt is uranyl propionate.

5. An article of manufacture suitable for the production of a planographic printing plate comprising a base coated with a colloidal hydrophilic carrier containing a monomer containing the $CH_2=C<$ grouping, a cross-linking agent, containing at least two vinyl groups and as a photopolymerization catalyst, a small quantity of the uranyl salt of an aliphatic acid having from one to two carboxy groups and a total number of carbon atoms which does not exceed eight, said carrier containing a sufficient amount of water to permit upon exposure to light, the induction of photopolymerization.

6. The process of producing a printing plate which comprises exposing under a pattern with actinic light having a wave length ranging from $10^{-4}$ to $10^{-10}$ cm., a base bearing a colloidal hydrophilic carrier containing a water soluble monomer containing the $CH_2=C<$ grouping, a cross-linking agent containing at least two vinyl groups, a small amount of a uranyl salt of an organic acid having no more than eight carbon atoms, said carrier containing a sufficient amount of water to permit upon exposure to light, the induction of photopolymerization, and developing the image by washing away the unpolymerized portions of the coating.

7. The process of producing a print which comprises exposing with visible light under a pattern a light sensitive material having a base bearing a colloidal hydrophilic carrier containing a water soluble monomer containing the $CH_2=C<$ grouping, a cross-linking agent containing at least two vinyl groups and a small amount of a uranyl salt of an organic acid having from one to two carboxy groups and a total number of carbon atoms lower than nine, said carrier containing a sufficient amount of water to permit upon exposure to light, the induction of photopolymerization, and developing the image by washing away with water the unpolymerized portions of the coating.

8. The process as defined in claim 7 wherein the uranyl salt is uranyl propionate.

9. The process according to claim 8 wherein the water contains an alkali metal ferrocyanide.

References Cited in the file of this patent

UNITED STATES PATENTS

| | | |
|---|---|---|
| 1,963,074 | Carothers et al. | June 19, 1934 |
| 2,206,022 | Britton et al. | July 2, 1940 |
| 2,344,785 | Owens et al. | Mar. 21, 1944 |
| 2,377,752 | Britton et al. | June 5, 1945 |
| 2,600,683 | Pearson | June 17, 1952 |
| 2,875,047 | Oster | Feb. 24, 1959 |
| 2,880,153 | Hiltz et al. | Mar. 31, 1959 |

OTHER REFERENCES

Hackh's Chemical Dictionary, 3rd edition, McGraw-Hill, New York, 1944, page 895.